US011345103B2

(12) United States Patent
Chigros et al.

(10) Patent No.: US 11,345,103 B2
(45) Date of Patent: May 31, 2022

(54) SIPE BLADE ASSEMBLY

(71) Applicant: COMPAGNIE GENERALE DES ETABLISSEMENTS MICHELIN, Clermont-Ferrand (FR)

(72) Inventors: Pierre Chigros, Clermont-Ferrand (FR); Damien Bardin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/771,901

(22) PCT Filed: Nov. 28, 2018

(86) PCT No.: PCT/FR2018/053023
§ 371 (c)(1),
(2) Date: Jun. 11, 2020

(87) PCT Pub. No.: WO2019/122561
PCT Pub. Date: Jun. 27, 2019

(65) Prior Publication Data
US 2021/0070000 A1    Mar. 11, 2021

(30) Foreign Application Priority Data
Dec. 18, 2017   (FR) ...................................... 1762364

(51) Int. Cl.
B29D 30/06    (2006.01)
(52) U.S. Cl.
CPC .. *B29D 30/0606* (2013.01); *B29D 2030/0613* (2013.01)
(58) Field of Classification Search
CPC ........ B29D 30/0606; B29D 2030/0612; B29D 2030/0613
See application file for complete search history.

(56) References Cited

U.S. PATENT DOCUMENTS 2,224,337 A * 12/1940 Bostwick ........... B29D 30/0606
29/515
3,570,571 A * 3/1971 Riches .................. B60C 11/042
152/209.21
(Continued)

FOREIGN PATENT DOCUMENTS

EP          858875    *  8/1998
FR       2939712 A1      6/2010
(Continued)

OTHER PUBLICATIONS

International Search Report and Written Opinion issued in related International Patent Application No. PCT/FR2018/053023 dated Feb. 22, 2019.

*Primary Examiner* — Niki Bakhtiari
*Assistant Examiner* — John J DeRusso
(74) *Attorney, Agent, or Firm* — Michele V. Frank; Venable LLP

(57) ABSTRACT

The present invention relates to a set of mould elements comprising main blades and secondary blades, intended to be added to a mould for vulcanizing a tread of a tire, the mould elements being capable of moulding cuts in the tread, characterized in that a main blade comprises at least one assembly device for assembling a secondary blade, the assembly device comprising two series of at least one protrusion arranged facing one another. It is thus possible to ensure a relative positioning and an assembly that can withstand mechanical stresses over the entire height of the blade during moulding/demoulding, while minimizing the volume of material added. This assembly is barely visible on the tire.

9 Claims, 5 Drawing Sheets

(56) References Cited

U.S. PATENT DOCUMENTS

| | | | | |
|---|---|---|---|---|
| 6,143,223 A * | 11/2000 | Merino Lopez | ... | B29D 30/0606 264/219 |
| 6,193,492 B1 * | 2/2001 | Lagnier | ... | B29C 33/48 152/DIG. 3 |
| 6,408,911 B1 * | 6/2002 | Tanabe | ... | B29D 30/0606 152/209.5 |
| 6,454,554 B1 * | 9/2002 | Lopez | ... | B29C 33/44 425/28.1 |
| 9,205,613 B2 * | 12/2015 | Montbel | ... | B29D 30/0606 |
| 10,315,339 B2 * | 6/2019 | Jenkins | ... | B29C 33/302 |
| 10,434,734 B2 * | 10/2019 | Chaland | ... | B29D 30/0606 |
| 2010/0078107 A1 * | 4/2010 | Bonhomme | ... | B60C 11/12 152/209.25 |
| 2017/0203365 A1 * | 7/2017 | Pays | ... | B22F 10/00 |
| 2018/0162016 A1 * | 6/2018 | Reeb | ... | B29C 33/3842 |
| 2019/0022965 A1 * | 1/2019 | Kamada | ... | B29D 30/0606 |

FOREIGN PATENT DOCUMENTS

| | | | |
|---|---|---|---|
| JP | 3-90317 | * | 4/1991 |
| JP | 11-58386 | * | 3/1999 |
| WO | 2015086974 A1 | | 6/2015 |
| WO | 2017102499 A1 | | 6/2017 |

* cited by examiner

SIPE BLADE ASSEMBLY

TECHNICAL FIELD

The present invention relates to the technical field of tyres and more particularly a set of mould elements for moulding cuts in a tread of a tyre. In particular, the invention relates to a set of mould elements forming a network of mould elements.

In curing moulds, the part for moulding the tread is made up of a plurality of elements making it possible to obtain cavities or sipes in the tread. In the interests of tyre performance but also mechanical strength in the mould, the sipes criss-cross one other.

PRIOR ART

FR2939712 discloses a network of bars and blades made in one piece by laser sintering. These bars and blades allow the moulding of a tyre with cuts in the tread. These bars and these blades make it possible to create reliefs which improve the grip of the tyre.

However, this network of bars and blades has a large size, and it can therefore undergo not insignificant deformation, in particular during its manufacture, resulting in its exceeding acceptable tolerances. Because of its size, bulky machinery is needed during manufacturing. Furthermore, when there is a defect in the part, the whole part must be rejected, which entails a relatively high cost.

Moreover, the new tyre tread patterns which make it possible to obtain better performance include grooves which are too fine to be produced with current techniques, in particular using aluminium. These grooves must therefore be made with blades. However, in tread patterns comprising fine bars and transverse blades, it is not possible to put in place transverse blades at the fine bar and thus guarantee their integrity in operation.

According to another prior art application, WO2015086974, this criss-crossing is achieved by means of reception slots positioned in solid parts (teardrops, wells, etc.).

These reception slots introduce void space in the tyre tread, which can be undesirable when defining the tread pattern.

There is therefore a need to find a solution which makes it possible to obtain a network of bars and blades which stays within the manufacturing tolerances, which is simple and practical to manufacture, the elements of which are of reasonable size, and which does not create unwanted hollows in the tread.

Definitions

"Tyre" means any type of resilient tyre whether or not it is subjected to an internal pressure.

"Tread" of a tyre means a quantity of rubber material delimited by lateral surfaces and by two main surfaces, one of which is intended to come into contact with a roadway when the tyre is being used and the other of which is oriented towards the inside of the tyre.

"Cut in a tread" means either a groove or a sipe.

"Groove" means a cut in the tread delimiting walls of material, the width of this cut is such that the walls associated with this cut cannot come into contact against one another under normal driving conditions. The width of a groove is greater than 2 millimetres. Grooves are moulded by mould elements referred to below as bars.

"Sipe" means a cut in the tread delimiting walls of material, the width of this cut is suitable to allow the walls of the sipe to come into contact, at least partially, when passing through the area of contact between the tyre and the ground. The width of a sipe is less than or equal to 2 millimetres and greater than or equal to 0.2 mm. Sipes are moulded by mould elements referred to below as blades.

"Mould element" means an element suitable for being placed in a mould intended for the vulcanization of a tyre in order to make cuts in said tyre.

"Height" means the dimension perpendicular to the bottom of the mould corresponding to the tread.

"Thickness of the blade" means the dimension perpendicular to the length and height of the blade.

"Base" means the surface parallel to the bottom of the mould and in contact therewith. The base has a "width" and a "length" which are perpendicular to the height.

SUMMARY OF THE INVENTION

The set of mould elements according to the invention comprises main blades and secondary blades, it is intended to be added to a mould for vulcanizing a tread of a tyre, said mould elements being capable of moulding cuts in the tread, and it is characterized in that a main blade comprises at least one assembly means for assembling a secondary blade, said assembly means comprising two series of at least one protrusion arranged facing one another. It is thus possible to ensure a relative positioning and an assembly that can withstand mechanical stresses over the entire height of the blade during moulding/demoulding, while minimizing the volume of material added. This assembly is barely visible on the tyre.

According to one particular feature, the protrusions facing one another are offset. This makes it possible to assemble an undulated blade over its entire length. Currently, it is necessary to have a straight area at the edge of the blade to facilitate assembly. This simplifies the work of mould makers.

Advantageously, the two series of protrusions facing one another are spaced apart by a distance slightly greater than the thickness of the secondary blade. It is thus easy to insert the secondary blade.

According to another feature, the protrusions of a series are spaced apart by a variable pitch. It is thus possible to adapt the assembly means to different shapes of blades.

Advantageously, the protrusions represent 1% of the weight of the set of moulding elements.

According to one particular arrangement, the protrusions are bevelled. This results in better blocking of the blade and better adaptation to its geometry.

According to another arrangement, the series of protrusions are inclined. It is thus possible to have an angle between the secondary blade and the main blade.

According to another embodiment, the protrusions are cubic, pyramidal, spherical, hemispherical or U-shaped.

The invention also relates to a mould comprising the set of mould elements with at least one of the above features. The mould elements may for example be anchored in the mould or adhesively bonded in the mould.

BRIEF DESCRIPTION OF THE DRAWINGS

Further features and advantages of the invention will emerge from the following description, provided by way of example, without intended limitation, with reference to the appended drawings in which.

In the description below, substantially identical or similar elements will be designated by identical references.

Figure 1:
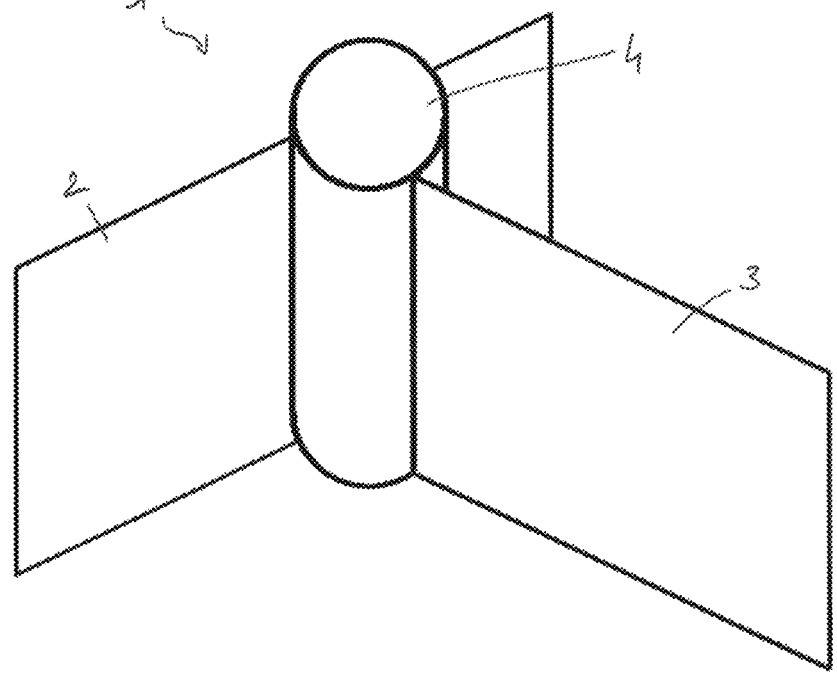
FIG. 1 is a view of a set of blades of the prior art.

The set 1 of mould elements according to the prior art, depicted in FIG. 1, comprises a main blade 2 and a secondary blade 3 interconnected in reception slots arranged in a portion 4 in relief on the main blade 2. As the portion 4 is split, it has a relatively large volume.

Figure 2:
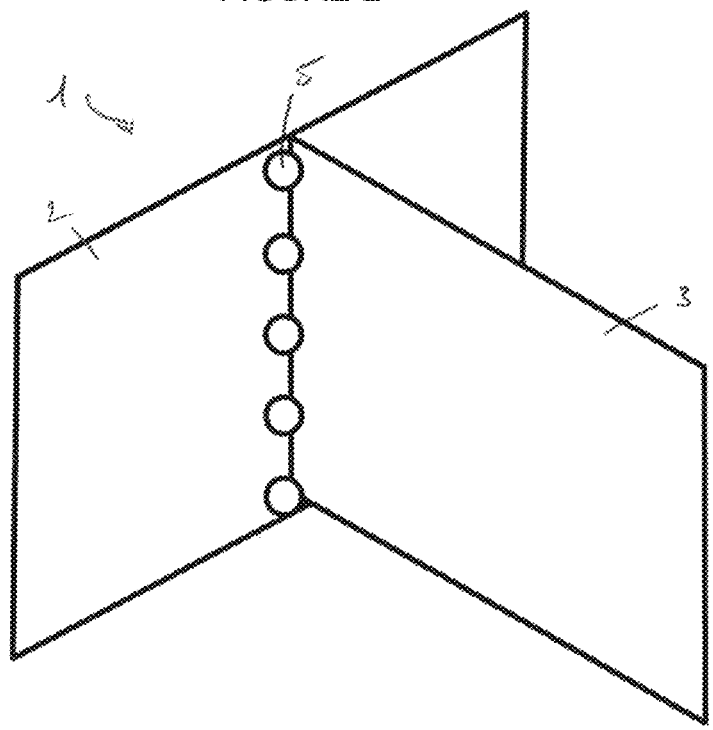
FIG. 2 is a view of a set of blades according to the invention.

In the set 1 according to the invention, shown in FIG. 2, the portion 4 has been replaced by several protrusions 5 arranged facing one another. These protrusions 5 are of small size. In a non-limiting embodiment, the protrusions represent only 5 to 20% of the main blade 2. In another alternative non-limiting embodiment, the protrusions represent at least 1% of the weight of the set 1.

The main blade 2 may have an anchoring zone 20.

Figure 3:
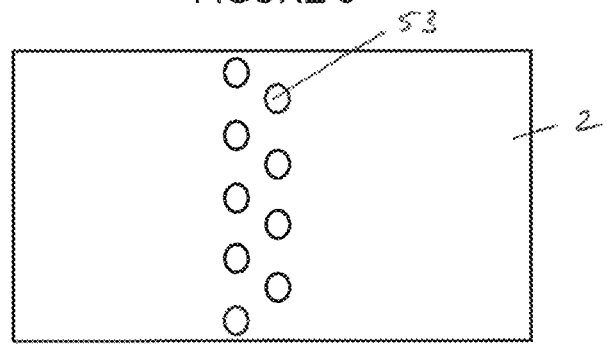
FIG. 3 shows an example of protrusions on a primary blade according to the invention.
Figure 4:
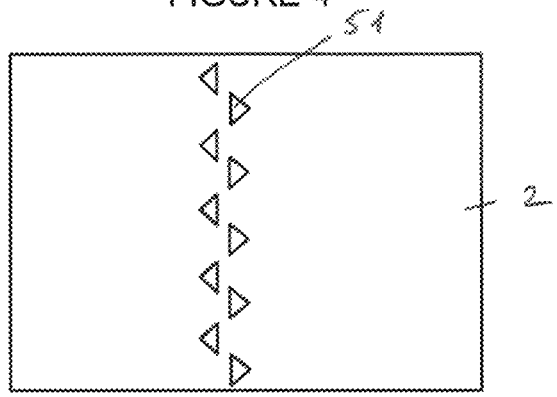
FIGS. 4, 4a and 4b depict other examples of protrusions on a primary blade according to the invention.
Figure 6:
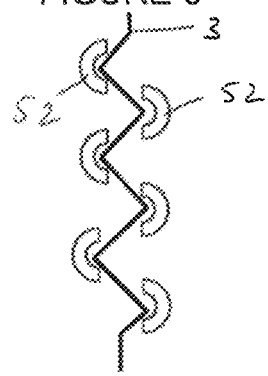
FIGS. 6, 7 and 8 are an alternative to FIG. 5.
Figure 7:
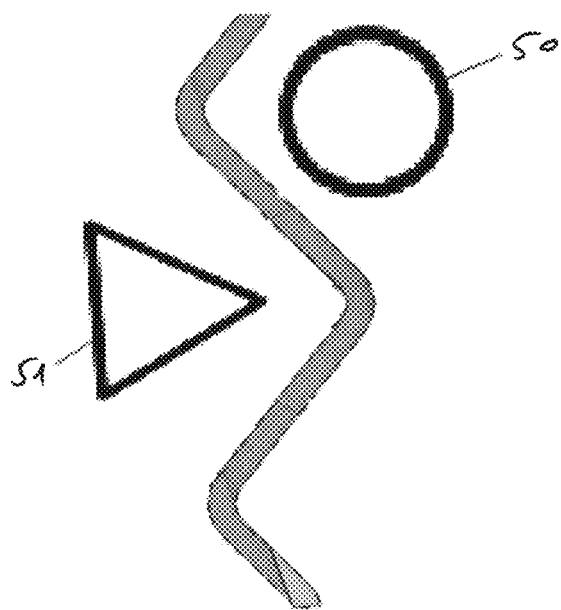
Figure 8:
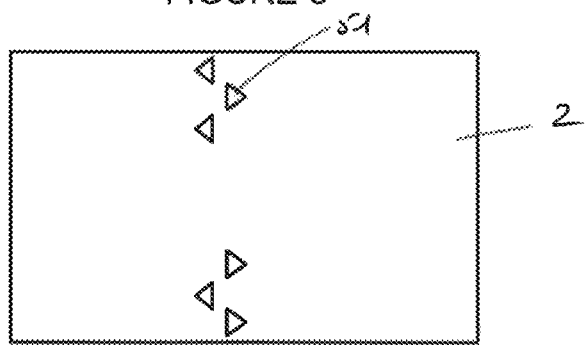
Figure 9:
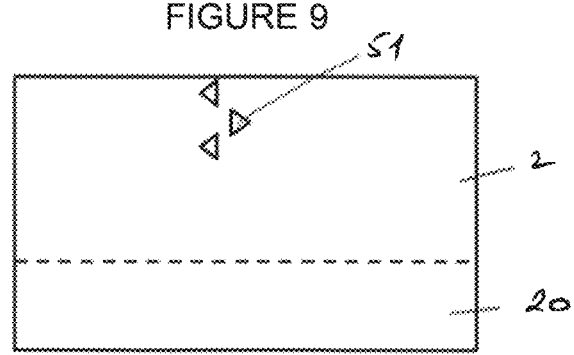
FIG. 9 shows a blade with its anchoring zone.

The protrusions 5 may have various shapes: circular 53 (FIG. 3), pyramidal 51 (FIGS. 4, 4a and 4b), conical, cubic 50, semi-circular, U-shaped 52 (FIG. 6), etc. It is possible to combine different shapes on the same main blade 2 (FIG. 7). The shape of the protrusion may be complementary to another shape of the object to be assembled, for additional blocking.

Figure 4A:
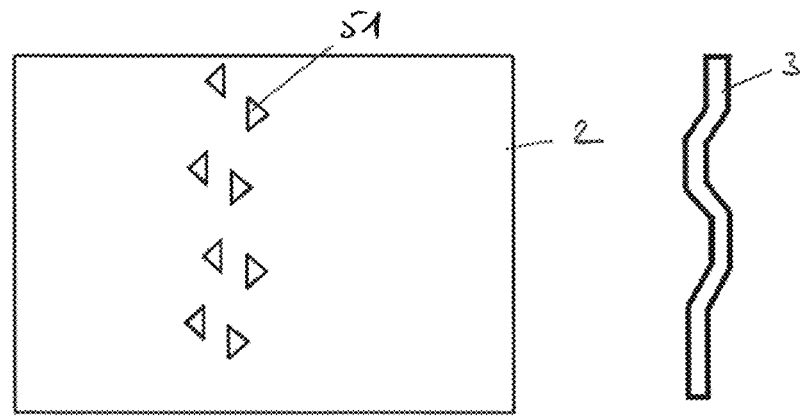
Figure 4B:
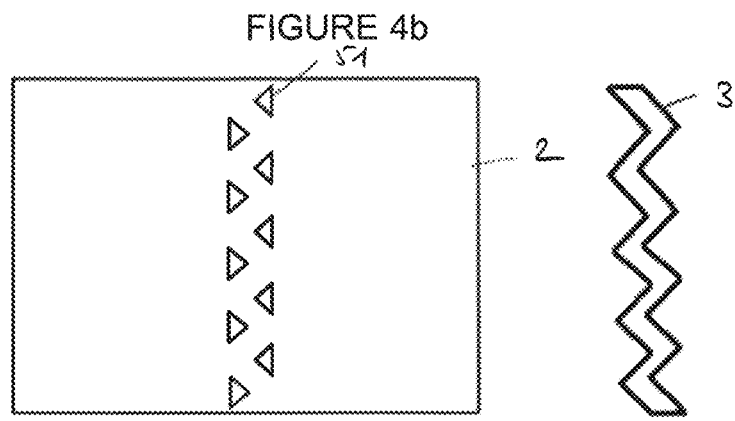

The protrusions may be offset laterally from one another in pairs if the blade is not straight in order to follow the profile of the blade 3, as depicted in FIG. 4a.

Figure 5:
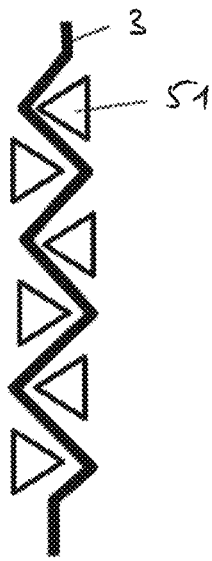
FIG. 5 shows in detail the mounting of a secondary blade on a primary blade according to the example of FIG. 4b.

The protrusions 5 are aligned vertically on the main blade 2 and may possibly overlap (FIGS. 5 and 7) in order to insert a secondary blade 3 which is undulated or zig-zag. They may be arranged over the entire height of the main blade 2 or over part of said height. The higher the height of the series of protrusions 4, the better the retention of the secondary blade 3. The protrusions 4 may have a constant pitch or a variable pitch.

Figure 10:
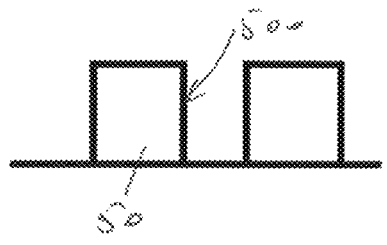
FIGS. 10 and 11 are sectional views of the protrusions according to two embodiments.
Figure 11:
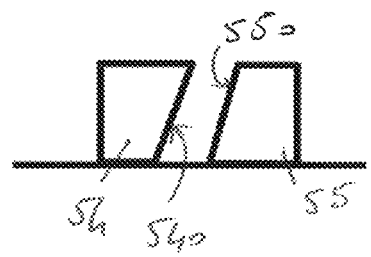

The protrusions 5 facing one another may have vertical edges 500 (FIG. 10) or inclined edges 540, 550 (FIG. 11). In the latter case, the edges 540 and 550 of each protrusion 54 and 55 are inclined on the same side in order to have a constant spacing between the two edges and to guarantee retention of the secondary blade 3. The inclination of the edge will define the angle between the main blade 2 and the secondary blade 3.

The number of protrusions 5 over the height of the main blade 2 is at least one protrusion per series of protrusions, that is to say at least one protrusion on one side and at least one protrusion on the other side. In this case, it is preferable to place these protrusions 4 as far as possible from the anchoring zone 20 of the main blade 2. In a non-limiting embodiment, a series of protrusions comprises at least two protrusions. In another non-limiting embodiment, the two series of protrusions comprise at least two protrusions.

In the case where the secondary blade 3 is undulated, it is possible to block the undulations in hollows of the protrusions 5 (U-shaped) or on points (pyramidal or circular shapes).

The undulated blades generally have a minimum thickness of 0.2 mm, and a maximum thickness of 10 mm. Preferably, the blades have a thickness <2 mm, because for thicker blades, the assembly means may be included in the thickness of the blade.

The protrusions 5 will preferably have dimensions of at least 1.5 mm per side. The protrusions 5 may be produced by welding on the main blade 2, by laser sintering, or by stamping.

The invention is not limited to the examples described and shown, and various modifications may be made thereto without departing from the scope of the invention.

The invention claimed is:

1. A set of mould elements, comprising main blades and secondary blades, intended to be added to a mould for vulcanizing a tread of a tire, said mould elements being capable of moulding cuts in the tread, characterized in that at least one of the main blades comprises at least one assembly device for assembling one of the secondary blades, said assembly device comprising two series of at least two protrusions, the two series being arranged facing one another along a length of the at least one of the main blades, such that a first series of the two series is spaced apart from a second series of the two series, with the spacing being provided to receive the one of the secondary blades.

2. The set of mould elements according to claim 1, wherein the at least two protrusions of the first series and the at least two protrusions of the second series facing one another are offset along the length of the at least one of the main blades.

3. The set of mould elements according to claim 1, wherein the protrusions of at least one of the first series and the second series are spaced apart by a variable pitch.

4. The set of mould elements according to claim 1, wherein the at least two protrusions of each of the two series are bevelled.

5. The set of mould elements according to claim 1, wherein protrusions of each of the two series are inclined.

6. The set of mould elements according to claim 1, wherein the at least two protrusions of each of the two series are cubic, pyramidal, spherical, hemispherical or U-shaped.

7. The set of mould elements according to claim 1, wherein the protrusions of the same series are substantially aligned vertically on the at least one of the main blades.

8. A mould comprising a set of mould elements according to claim 1.

9. A set of mould elements, comprising main blades and secondary blades, intended to be added to a mould for vulcanizing a tread of a tire, said mould elements being capable of moulding cuts in the tread, characterized in that at least one of the main blades comprises at least one assembly device for assembling one of the secondary blades, said assembly device comprising two series of at least one protrusion arranged facing one another, wherein the protrusions of at least one series of the two series are spaced apart by a variable pitch.

* * * * *